US005590335A

United States Patent [19]

Dubourreau et al.

[11] Patent Number: 5,590,335
[45] Date of Patent: Dec. 31, 1996

[54] PROCESS FOR ANALYSIS OF DEADLOCKS IN AN OPERATING SYSTEM

[75] Inventors: Jean-Paul Dubourreau, Biviers; Thierry Jacquin, Echirolles, both of France

[73] Assignee: Bull S.A., Puteaux, France

[21] Appl. No.: 626,597

[22] Filed: Apr. 2, 1996

Related U.S. Application Data

[63] Continuation of Ser. No. 263,082, Jun. 21, 1994.

[30] Foreign Application Priority Data

Aug. 3, 1993 [FR] France .................................. 93 09533

[51] Int. Cl.⁶ ...................................................... G06F 15/16
[52] U.S. Cl. ............................ 393/704; 395/288; 395/674
[58] Field of Search .............................. 364/DIG. 1, 230,
364/200, 288, 231.6, 231.8, 232.3, 232.4,
242.6; 395/650, 700, 50

[56] References Cited

U.S. PATENT DOCUMENTS

| | | | |
|---|---|---|---|
| 4,318,182 | 3/1982 | Bachman et al. ....................... | 364/200 |
| 4,494,193 | 1/1985 | Brahm et al. ........................... | 364/200 |
| 4,791,554 | 12/1988 | Hirota et al. ............................ | 364/200 |
| 4,802,164 | 1/1989 | Fukuoka et al. ......................... | 371/16 |
| 4,881,166 | 11/1989 | Thompson et al. ..................... | 364/200 |
| 5,016,167 | 5/1991 | Nguyen et al. ......................... | 364/200 |
| 5,133,074 | 7/1992 | Chou ....................................... | 395/725 |
| 5,161,227 | 11/1992 | Dias et al. .............................. | 395/650 |
| 5,167,022 | 11/1992 | Bahr et al. .............................. | 395/325 |
| 5,182,808 | 1/1993 | Bagnoli et al. ......................... | 395/725 |

FOREIGN PATENT DOCUMENTS

WO8900734  1/1989  WIPO.

OTHER PUBLICATIONS

"The Distributed Deadlock Detection Algorithm", D. Z. Badal, ACT Transactions on Computer Systems, vol. 4, No. 4, Nov. 1986, New York, pp. 320–327.

"Scheduler Activations: Effective Kernel Support for the User–Level Management of Parallelism", Thomas E. Anderson, et al, 13th ACM Symposium on Operating System Principles, Oct. 13, 1991, New York, pp. 95–109.

"Debugging Tools for the MVS/XA Environment", Ory Chazan, 17th Mini–G.U.I.D.E. Conference, Nov. 23, 1988, G.U.I.D.E., Ebikon, Switzerland, pp. 528–532.

"Deadlock Detection for all Resource classes", R. L. Obermarck, IBM Tech. Discl. Bulletin, vol. 22 No. 11 Apr. 1980 pp. 5078–5079.

"Deadlock Detection for all Resource Classes", R. L. Obermarck, IBM Technical Disclosure Bulletin, vol. 22, No. 11, Apr. 1980, New York, pp. 5078–5079.

Primary Examiner—Kevin A. Kriess
Assistant Examiner—Majid A. Banankhah
Attorney, Agent, or Firm—Weingarten, Schurgin, Gagnebin & Hayes LLP

[57] ABSTRACT

A process for analyzing deadlocks in an operating system of a machine uses a method which consists of searching, for any thread stopped on a lock, for the thread that holds that lock and when the thread itself is waiting for a lock, of going up the chain until a cycle is found. When the machine has a symmetrical multiprocessor and operates in a UNIX environment, this process makes iterative use of a specific function which makes it possible to go from one thread and from all the processors to any type of lock (active or passive waiting) by going through the threads one after the other to reconstruct a deadlock and hence a cycle, element by element. When a virtual memory is used such that all the necessary information is not in the physical memory, it also helps a user arrange all the chains provided by said process to reconstruct the cycle determining the deadlock.

8 Claims, 3 Drawing Sheets

PROCESS FOR ANALYSIS OF DEADLOCKS IN AN OPERATING SYSTEM

This application is a continuation of application Ser. No. 08/263,082, filed Jun. 21, 1994.

FIELD OF THE INVENTION

The present invention relates to computing machinery operating systems and more particularly to analysis of deadlocks in an operating system.

BACKGROUND OF THE INVENTION

Processes are known for the analysis of deadlocks in an operating system of a machine that consists of searching for a whole unit of execution (called a "thread" by the expert) stopped on a lock (also called a "lock" by the expert), the thread that holds that lock and when that thread is itself waiting for another lock, of going up the chain until it finds a cycle. Such a process for analysis of deadlocks is usually used and this traditional process is described, for example, in "Modern Operating Systems," Tanenbaum 1992 (Prentice-Hall International Editions).

Graph theory is used to solve deadlock problems, and this paper proposes modelling in which the dependency graph of a system is composed of two families of nodes: the processes and the resources that we will transpose to adapt to our application in locks and threads connected by means of arcs according to the following semantics. An arc connecting a thread to a lock means that the thread is stopped waiting for that lock. Inversely, an arc connecting a lock to a thread means that the thread holds that lock, which is therefore temporarily assigned to it. Thus, if the thread T1 is waiting for a lock L1 which is then held by a thread T2 which cannot release that lock L1 because the thread T2 is itself waiting for a lock L2 held by the thread T1, a cycle is formed on the graph and the two threads T1 and T2 are irretrievably stopped, and there is a deadlock. In this example, the cycle formed on the graph is the following: T1→L1→T2→L2→T1.

This type of process can give satisfactory results when it is applied to the analysis of deadlocks in an operating system of a machine that has only one processor, but it shows its limitations and therefore cannot be used effectively with an operating system of a machine that has a symmetrical multiprocessor, even more so when the machine operates in a UNIX environment (trademark of UNIX System Laboratories, Inc.). Indeed, for reasons of performance, an operating system of this type favors the use of "active" locks, i.e., locks which when they are encountered generate an active wait. This active wait is usually justified in a case where a lock is not free but the holder of said lock is active on another processor. In such a case, not waiting actively for a lock which has a very strong probability of being released rather quickly, would be harmful. In addition, exception or interrupt handlers do not have their own execution context, cannot be authorized to go to sleep waiting for a lock and must consequently also wait actively. This can lead to a stack of active waits on a processor, because a thread which is actively waiting for a lock can also be interrupted, while the interrupt handler itself can actively be waiting for a lock.

In searching for a deadlock and analyzing such a situation, the lock stopping the thread is not the one that made it wait (and which has since been released), but the one the interrupt handler was waiting for. Moreover, it can happen that an interrupt handler itself is interrupted for a reason of higher priority, and this therefore then results in a stack that can then reach several stages. If several interrupt handlers in this stack are waiting for a lock, the lock stopping the thread is the one awaited by the higher priority interrupt handler. In that case, the traditional process does not allow a real graph of dependencies to be made or, in particular, a reliable definition of the arcs going from the nodes to the lock-type nodes.

SUMMARY OF THE INVENTION

This invention proposes a process for analyzing deadlocks that has no limits and thus none of the disadvantages of the known processes, particularly when it is used with an operating system of a machine that has a symmetrical multiprocessor and operates in a UNIX environment. The type of deadlock analysis process is remarkable in that when the machine has a symmetrical multiprocessor and operates in a UNIX environment, it also uses a specific function iteratively which makes it possible to go from a thread and from all of the processors to any kind of lock by going through one thread after another to reconstruct a deadlock, and hence a cycle, element by element.

A deadlock can be analyzed effectively even in the case of an operating system running a symmetrical multiprocessor and operating in a UNIX environment. Indeed, the processor executing the thread concerned is thus known, all of threads are going to be gone through and elements from the cycle will be extracted thread by thread until a cycle is reconstructed and a complete report is output that can be used by the user for any type of lock: one waiting actively or passively. Using such a process makes the user completely independent of the internal mechanism of locks. Moreover, the processing of existing information, i.e., the information present and directly accessible in memory, is totally automated, which is another important advantage over the traditional process whose application was manual and consequently, depending on the difficulties, could be excessively long and tiresome or simply not result in the least missing information.

With any developmental tool, the basic primitives are furnished which make it possible to go see what a thread or a processor is executing and to know what the status of the lock is; a user can thus generally use the traditional process or the process according to the invention. However, the process according to the invention, used in its principle runs counter to the traditional technique, since the natural approach is to have a thread correspond to a lock without worrying about the status of the processors and without verifying how the threads have been interrupted or taking into account search priorities.

There is also another interesting aspect. Beyond the deadlock associated with the locks, a thread can sometimes be interrupted waiting for an event that can be a wait for a different system resource; this appears in a chain of elements forming the deadlock and thus makes it possible to explain any wait, whatever the reason. Similarly, the traditional process can prove ineffective in analyzing a deadlock in an operating system with a virtual memory. Indeed, only information present in physical memory is directly usable to search a cycle; any information permitting detection of a cycle that is not in physical memory then prevents finding said cycle. This means then that it does not have a complete graph, certain arcs and certain nodes that may not be marked in physical memory in this particular case.

Another purpose of this invention consists of providing an effective solution to the problems posed in the traditional process when the system uses a virtual memory and consequently all the necessary information is not necessarily found in the physical memory. For that, the process according to the invention is remarkable in that, after having detected all the chains of dependencies between locks and threads, information on the stack of each thread is also delivered and that information then authorizes the user to arrange all the chains together so as to reconstruct the cycle determining the deadlock. Thus, to give the user the opportunity to resolve this problem of information not present in physical memory, in one of its specific steps, the process makes it possible to detect all the chains of dependencies between locks and threads and then deliver the information about the stack for each thread. This information allows the operator to connect a subunit of chains in order to reconstruct the cycle characterizing the deadlock. In fact, total automation of the search for a cycle can only be achieved if all the information is present in physical memory; with the use of a virtual memory, the probability that some information is not stored in physical memory is far from absent and in this case, the search mode is no longer completely automatic, but corresponds to an assisted mode. When information is not present in physical memory, according to the process, the user is presented with information about the stack and that information will then enable the user, who does not have to have any specific knowledge about locks, to find the missing cycle piece(s) during the search automatically, and the user's knowledge of the context then enables him to reconstruct the cycle in its entirety. What the user must acquire to do so can be limited to knowledge of the relations between a number of tasks in the system and rough knowledge of the tree structure and the specification (functionalities). The user then searches for the deadlock in assisted mode, but he is completely independent of the internal mechanism of locks, since he has no need to know how said locks are programmed or what type of lock is concerned by the application in question. In this way, the totally automatic mode and the user-assisted mode coexist, while the necessary information is available in physical memory; the first automatic mode is operational in the search for a cycle in a graph and if information is missing, the user-assisted mode takes over to reconstruct the whole cycle from the pieces found.

Such an analysis with deadlock detection can then be used easily. So the locks and the tasks implied in the deadlock are known and make it possible to modify the programming effectively. When the cycle is characterized, the threads involved in the cycle, the functions of the threads that hold the locks, the types of lock, and the operations carried out by the threads at the time when they were blocked are determined, thus making it possible to find the programming and potentially to detect violations of hierarchy. Then the deadlocks can be corrected by the developers using a static deadlock analyzer. The basic purpose of deadlock analysis in this process is to show a defect in the system by going back to its origin and doing so with the greatest possible precision so as to correct it in a later development phase.

BRIEF DESCRIPTION OF THE DRAWINGS

The following description, which refers to the appended drawings, all given as a nonlimiting example, will provide a good understanding of how the invention can be used.

DETAILED DESCRIPTION

Figure 1:
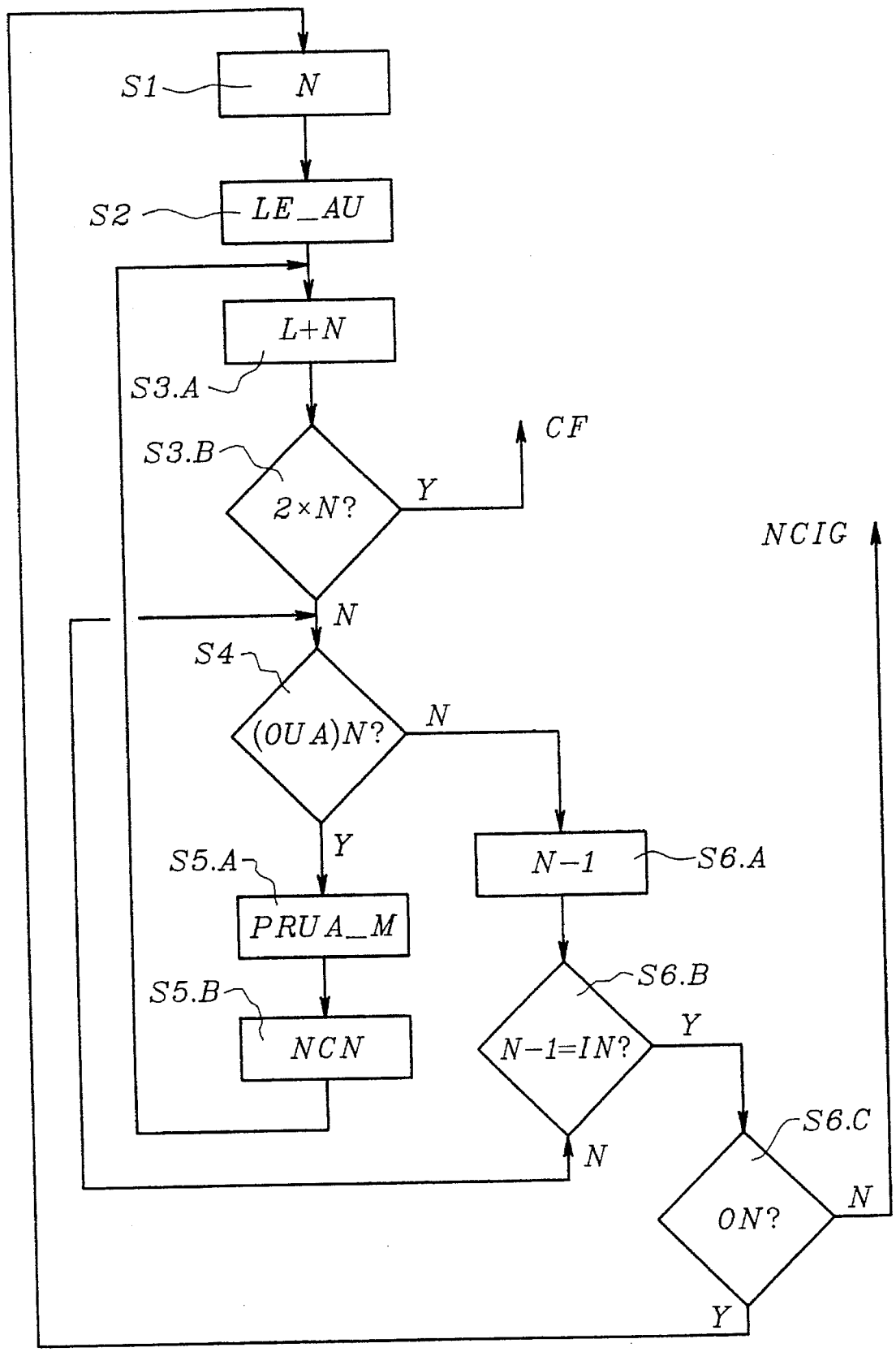
FIG. 1 is a diagram describing the different steps in the application of the traditional deadlock analysis process.

In FIG. 1, the different steps in the traditional deadlock analysis process are described in the form of an algorithm. For a better understanding of the invention, some specifics on the terminology used are given below. Generally speaking, a deadlock can be produced when an operating system makes a dynamic allocation of resources, since it allows a task to begin execution before having acquired all the necessary resources. A lock is an example of a mechanism regulating access to resources that support a limited number of concurrent accesses. Also, a system can simultaneously execute several processes, a process including a sequence of machine instructions, as well as the information on the status of its execution. Each process can be broken down to be executed by a large number of processors; the fraction of the process being executed on a given processor at a given moment is called a thread. As was explained above, the traditional process consists of searching for any thread locked on a lock, the thread that holds the lock and, if that thread is itself waiting for another lock, of going up the chain until a cycle is found. A cycle detected in the graph of dependencies indicates that a deadlock has been found involving the processes and the resources in said cycle, with the graph of dependencies here composed of two families of nodes, on one hand the locks and on the other the processes or threads.

Once the graph of dependencies has been obtained, the traditional process described with FIG. 1 is used. Thus, the first step S1 of initialization [N] can be expressed in this way: for any node N (lock or thread) on the graph, call the next five steps with N as the point of departure. Step S2 is for initialization of an empty list L [LE], while all the arcs connecting the nodes are declared unmarked [AU]. In step S3.A [L+N], the current node is added to the end of the list L, while in step S3.B [2×N?] the question is asked: "Does the current node N appear twice on the list L?" If the answer is yes (Y) , this double appearance demonstrates that the graph contains a cycle (listed on the list L) and the process is stopped since the cycle is found [CF]. Conversely, if the answer is no (N), it goes to step S4 [(OUA)N? ] where the following question is asked: Are there arcs that come from the current node and are unmarked?" If the answer is yes, the next step is step S5.A [PRUA+M], during which an arc going out unmarked is randomly chosen to be marked, then in step S5.B [NCN], the node specified by that arc is considered the new current node and there is a return to step S3.A. If, on the other hand, the answer to the question in step S4 is no, the process is at an impasse, and step S6.A [N−1] allows it to return to the preceding node (the one that was the current node just before this last one), which is then considered the current node. In step S6.B [N−1=IN?], the question is asked: "Is the node the initial node?" If the answer is no, there is a return to step S4, while if the answer is yes, in step S6.C [ON?], a final question is asked: "Is there another node?" A negative response stops the process, informing us that from this current node, there is no cycle in the graph [NCIG]. Finally, if the answer is yes, there is a return to step S1 for analysis of the remaining node or nodes.

Figure 2:
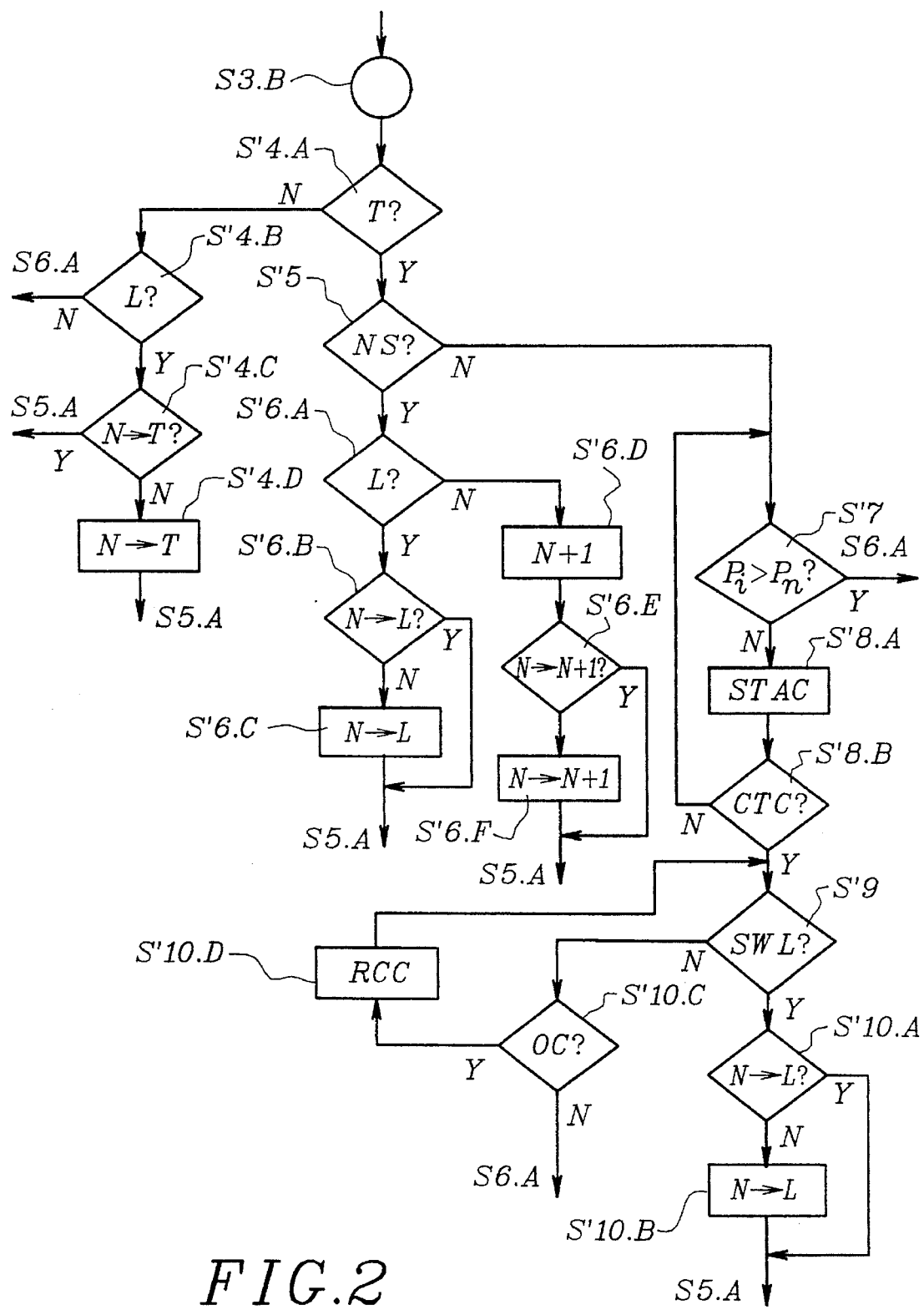
FIG. 2 proposes a diagram describing the different steps in the application of the process in the invention adapted for analysis of deadlocks on a machine with a symmetrical multiprocessor that operates in a UNIX environment.

FIG. 2 proposes a diagram describing the different steps in the process in the invention, which makes it possible effectively to adapt the traditional process for analyzing deadlocks to a machine that has a symmetrical multiprocessor and operates in a UNIX environment. This adaptation is obtained advantageously through the specific function defining the arcs connecting the threads for all processors with locks. Indeed, in accordance with the idea in the invention, the process is remarkable in that it makes iterative use of a specific function which makes it possible to go from one thread and from all processors to any type of thread going through the threads one after the other to reconstruct a deadlock, and hence a cycle, element by element.

For that, step S4 is replaced by the steps described below which make it possible to implement said specific function. Steps S1 to S3 (S3.A+S3.B), S5 (S5.A+S5.B) and S6 (S6.A+S6.B+S6.C) of the traditional process are retained. Thus, in the present process according to the invention, a negative answer to the question asked in step S3.B of the traditional method corresponds to step S'4.A in which the question is asked [T?]: "Is the current node the thread type?" If the answer is negative, the following question is asked in step S'4.B [L?]: "Is the current node a lock?" If the answer is negative, the process is in an impasse and it goes to step S6.A of the traditional process (see FIG. 1) for equivalent processing (S6.A, S6.B, S6.C). If, on the contrary, the current node is a lock, this means that the thread T is the one holding the lock L or even the unit interrupted by an interrupt "lock" holding the lock L. In this case, the step S'4.C follows with the question [N→T? ]: "Is there an arc connecting the current node N to a thread T?" An affirmative answer moves on to step S5.A of the traditional process. A negative answer is followed by step S'4.D, where an arc from the current node N to the thread T [N→T] is defined, and then it goes to step S5.A of the traditional process.

Conversely, when the answer to the question [T?] in step S'4.A is affirmative, the following question is asked in step S'5 [NS?]: "Is the current thread T asleep (waiting)?" An affirmative answer brings us to step S'6.A where the following question is asked [L?]: "Is the event awaited a lock?" If the answer is yes, then in step S'6.B, the question [N→L] is asked: "Is there an arc connecting the current node N to the lock L?" If the answer is yes, it goes to step S5.A of the traditional process; if the answer is no, it is step S'6.C, where an arc from the current node N to the lock L [NL] is defined, and step S'6.C is followed by moving to step S5.A of the traditional process. In addition, a negative answer to the question [L?] in step S'6.A means that the wait is related to an event other than a lock; then in step S'6.D, a neutral-type node [N+1] is added, and in step S'6.E the question [N→N+1?] is asked: "Is there an arc connecting the current preceding node N to the current new node N+1?" An affirmative answer is followed by moving to step S5.A of the traditional process, while a negative response brings step S'6.F where an arc is defined connecting node N to the new current node N+1 [N→N+1], then it moves on to step S5.A of the traditional process. It should be explained that a neutral-type node corresponds to any event which is neither a lock nor a thread and can, for example, be a signal awaited by a thread.

A negative answer to the question in step S'5 means that the current thread is active. All processors must be gone through from Po to Pn, and a question is asked in step S'7: "Have all processors been gone through?" [Pi>Pn?]. If yes, it moves to step S6.A of the traditional process, and the cycle of dependence has to be elsewhere if there is one; the thread consequently has no dependence. If the response is no, the next step is S'8.A during which the stack to be executed in the current processor Pi is gone through, up to the last execution context [STAC], and then in step S'8.B the following question is asked: "Is the execution context checked that of the current thread?" [CTC?]. A negative response takes you back to step S'7. Conversely, an affirmative response means that the processor on which the thread is active is found, which leads to step S'9 and the question: "Is the stack of the current context of the current processor waiting for a lock?" [SWL?]. An affirmative answer leads to step S'10.A [N→L?] where the following question is asked: "Is there an arc connecting the current node N to the lock L?" If the answer is yes, it moves to step S5.A of the traditional process. If the answer is no, since the current call of the stack associated with the current context is a lock request, in step S'10.B [N→L], an arc is then traced from the current node N to the lock L requested by the current call, then there is a return to step S5.A of the traditional process. In the opposite case, the negative answer to the question [SWL?] in step S'9 brings up another question [OC?] in step S'10.C: "Is there another execution context?" If there is another context which follows, the latter is redefined as the current context, step S'10.D [RCC], then there is a return to step S'9. Conversely, if the answer to the question in step S'10.C is no, there is no other context, which means that the thread is not stopped by a lock which entails moving to step S6 of the traditional process described with FIG. 1.

Figure 3:
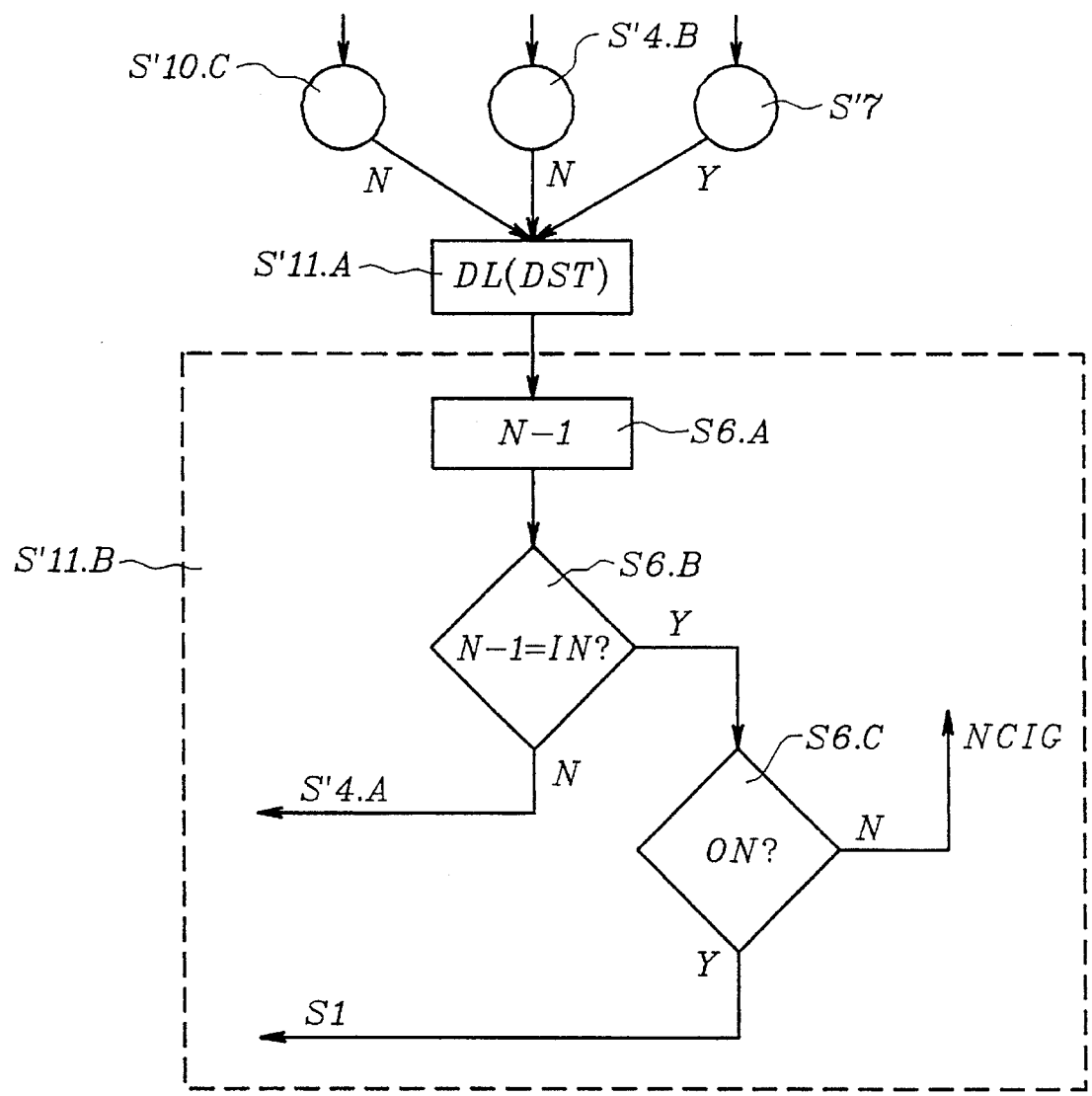
FIG. 3 also proposes adaptation of certain steps described in the diagram in FIG. 1 and shown in FIG. 2 that can be used on a system with a virtual memory.

FIG. 3 proposes an adaptation of certain steps described in the diagram in FIG. 1 and also indicated in FIG. 2, an adaptation which authorizes effective use of the process in the invention applied to an operating system with a virtual memory. Indeed, as has been said before, the traditional process described with FIG. 1 will prove not very effective in analyzing a deadlock in an operating system with a virtual memory. A cycle search can only succeed provided that there is all the necessary information in the physical memory; but some information that permits detection of the cycle can, at a given moment, be found not in physical memory but in virtual memory. Under these conditions, a complete graph of dependencies cannot be made if some arcs and some nodes (thread or lock) are not marked in physical memory.

In order to give the user the opportunity to solve this problem advantageously, the present process is provided to detect all the chains of dependence between locks and threads, and information about the stack for each thread is also provided; this information then authorizes the user to arrange all the chains so as to reconstruct the cycle determining the deadlock. For this purpose, step S6 (S6.A, S6.B, S6.C) of the traditional process (see FIGS. 1 and 2) is modified in the following way: A negative answer to the questions asked in step S'4.B [L?] and in step S'10.C [OC?], like a positive answer to the question [Pi>Pn?] in step S'7 is followed by step S'11.A, which is related to displaying the list L [DL (DST)] which can be therefore used by the user; in particular, the stack associated with all the threads encountered on that list is decoded. Step S'11.B which follows is identical to step S6 (S6.A, S6.B, S6.C) of the traditional process.

According to a first preferred application, the process in the invention can be used by a development tool having consultation access to the whole physical memory.

According to a second preferred application, the process in the invention can be used by a tool for analyzing memory dumps. In this way, a machine that is in operation or in the test phase can advantageously benefit from the application of this process. When deadlocks occur, said machine can become almost unavailable; in that case, one can resort to a tool, either interactively, which is then a development tool used to implement the process, or retrospectively by calling on a tool for analyzing memory dumps and in this case, an image is taken of the machine's memory whose status is analyzed by a tool for analyzing memory dumps, either on another machine or on the same machine which has been restarted.

In conclusion, the process in the invention offers, on one hand, generics to deal with problems posed by the use of a symmetrical multiprocessor and, on the other hand, the necessary user assistance when this process is used in an operating system with a virtual memory. The usual traps confronting the user can therefore be easily detected and avoided, for example when a deadlock is not due specifically to locks that may not stop threads but to other events, such as locks awaited by interrupt handlers. For that, the user does not necessarily have to be a specialist in nodes of operating systems with advanced knowledge of the structures of the node, as was previously the case, to know how to get back to where the information is, just a person with a knowledge of the relations between a number of tasks and a relatively rough knowledge of the tree structure and the functionalities given in the specification. With this knowledge, the process is highly effective, since because of its specific function enabling it to go from one thread and from one group of processors to any type of simple or complex lock, it provides the user either directly with the reasons for the deadlock or with a group of links in the chain allowing him to go back easily to the deadlock. Obviously, this process which permits an effective search for threads is also effective for processes, since a thread is, as was explained before, a fraction of a process, so it permits a finer approach to the process.

What is claimed is:

1. A process for analyzing deadlocks in an operating system of a machine comprising a symmetrical multiprocessor operating in a UNIX environment, said process implemented by iteratively executing a specific function for tracing a thread from any one of plural processors in said symmetrical multiprocessor to any type of lock, said process comprising:

searching all processors of said symmetrical multiprocessor for and identifying a waiting thread stopped on a lock or waiting for a holding signal from an element of said machine;

searching for and identifying a holding thread that holds said lock or said holding signal from said element of said machine; and when said holding thread is itself waiting for another lock, repeating the previous process steps through chains of interrelated threads and locks until a cycle is identified, wherein said function makes it possible to reconstruct a deadlock, and hence a cycle, element by element.

2. The process for analyzing deadlocks according to claim 1, wherein when said machine further comprises a virtual memory such that all necessary information is not in physical memory, and after all the chains of dependence between locks and threads are found, information about a processor stack associated with each thread and indicative of contents of said virtual memory is also provided, wherein said processor stack information enables a user to arrange the chains to reconstruct the cycle for determining the deadlock.

3. The process for analyzing deadlocks according to claim 2, wherein the specific function is implemented within a diagnostic device according to the following steps:

a. search within machine physical memory for the nature of a current node (thread or lock) on a list within said diagnostic device and if the current node is a thread, go to step b., else if the current node is a lock, the lock is held by a holding thread and an arc is created within the list to connect the held lock to the holding thread, though if the current node is neither a thread nor a lock, the process is in an impasse from which it cannot get out using part of the known process;

b. if said current node on the diagnostic device list is a thread, identify by searching the physical memory if said current thread is waiting, and if it is, go to step c., if it is not, go to step d.;

c. if said current thread is waiting, identify within the physical memory if the event awaited is a lock, and if it is, trace an arc within the list to the awaited lock and return to step a., if it is not, and the wait is due to another event, then add a neutral-type node to the diagnostic device list and trace within the list an arc to that new node if there isn't one already;

d. if said current thread is active for any processor of the machine, go to step e., unless all processors have been gone through by the present process, wherein the thread is waiting for a processor resource, and the cycle of dependence has to be elsewhere, if there is one so that the current thread has no dependence;

e. if said current thread is active for any processor of the machine as determined by an analysis of the physical memory, the stack of the current processor is gone through to the last execution context, and if this execution context is that of the current thread, go to step f., but if it is not, go to step d. and look for another processor, up to the last processor;

f. if the processor on which the current active thread has been found, search the physical memory as to whether the stack is waiting for a lock and for any execution context of the stack of the processor, go to step g.; and g. if the current call of the stack associated with the current execution context is a lock request, trace an arc within the diagnostic device list, if there isn't one already, from the current thread to the lock requested by said current call, and if it is not, if there is a subsequent execution context, reapply steps f. and g. to the subsequent execution context, though if there is no other subsequent context, the current thread is not stopped by a lock and the process is in an impasse which it can get out of by using part of known processes.

4. The process for analyzing deadlocks according to claim 3, wherein when the cycle of dependence cannot be reconstructed due to the fact that all the necessary information is not in the physical memory, after having detected all chains of dependence between threads and locks, in a first iteration, the list of the threads and locks with their dependencies is displayed to be used by the user; in particular, the processor stack associated with all the threads encountered on this list is decoded, then in a second iteration, the known processes mentioned in step g. of claim 3 is used.

5. The process according to claim 1, wherein said process is for analyzing deadlocks in an operating system between processes and resources.

6. The process according to claim 1, wherein said process forms part of a development tool having access to all physical memory.

7. The process according to claim 1, further including the use of a memory dump analysis tool to implement the process.

8. The process according to claim 1, wherein said element of said machine is an interrupt handler and said holding signal is an interrupt.

* * * * *